United States Patent
Sato

(10) Patent No.: US 7,138,053 B2
(45) Date of Patent: Nov. 21, 2006

(54) FILTER DEVICE

(75) Inventor: Nobuo Sato, Minato-ku (JP)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 10/547,646

(22) PCT Filed: Mar. 4, 2004

(86) PCT No.: PCT/JP2004/002742

§ 371 (c)(1),
(2), (4) Date: Sep. 1, 2005

(87) PCT Pub. No.: WO2004/078318

PCT Pub. Date: Sep. 16, 2004

(65) Prior Publication Data

US 2006/0144772 A1 Jul. 6, 2006

(30) Foreign Application Priority Data

Mar. 6, 2003 (JP) .............................. 2003-060229

(51) Int. Cl.
*B01D 27/08* (2006.01)
*B01D 35/30* (2006.01)
(52) U.S. Cl. ........................ 210/232; 210/236; 210/238
(58) Field of Classification Search ................ 210/232, 210/236, 238, 444
See application file for complete search history.

(56) References Cited

U.S. PATENT DOCUMENTS 5,022,986 A   6/1991  Lang
5,397,462 A * 3/1995  Higashijima et al. ....... 210/136

FOREIGN PATENT DOCUMENTS

JP          48-76150 A      10/1973

* cited by examiner

*Primary Examiner*—Thomas M. Lithgow
(74) *Attorney, Agent, or Firm*—Hamilton, Brook, Smith & Reynolds, P.C.

(57) ABSTRACT

An object of the present invention is to provide a filter device of the type that the filter element is exchangeable, said device can be easily and accurately connected and disconnected to the fixed head which leads to a plumbing system, by simple operations.

A filter device comprising a fixed head (1) having a feed liquid inlet and/or an outlet for filtrate, a stationary base member (2, 3), a first link (7) having one end pivotally mounted on the stationary base member at a first axis (5), a second link (11) supported by the first link, a housing support member (12) supported by the second link, and a housing (15) supported by the housing support member, said housing having a space with an open top end for housing a filter element, a manipulation handle (17) fixed to the housing (15) or the housing support member (12), and a connector means (19) for connecting the top end portion of the housing to the fixed head, said housing (15) is movably supported by the housing support member (12) having a means for allowing the housing (15) to move relative to the housing support member by a distance necessary for connecting the connector means (19) to the fixed head (1).

10 Claims, 8 Drawing Sheets

1: fixed head, 2: support flame, 3: stationary base member, 5: first axis, 7: first link, 9: second axis, 11: second link, 12: housing support member, 13: third axis, 15: housing, 17: handle, 19: connector ring, 21: abutting portion, 23: stopper portion, 25: engaging portion, 33: filtrate outlet, 35: feed liquid inlet, 37: vent port, 39: discharge outlet FIG. 4
(a)
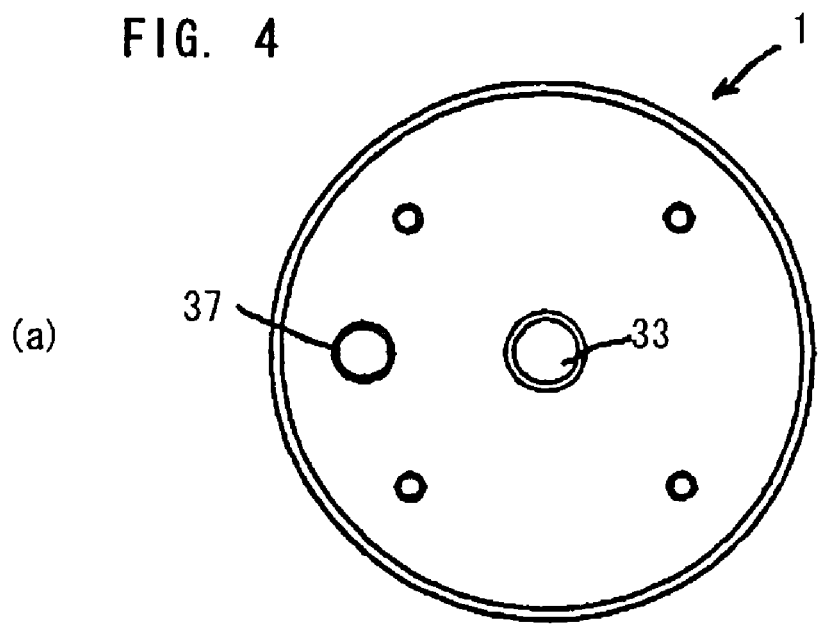
(b)
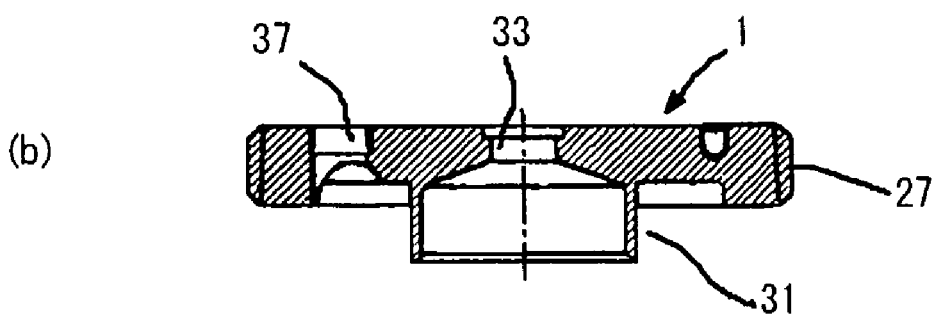
(c)
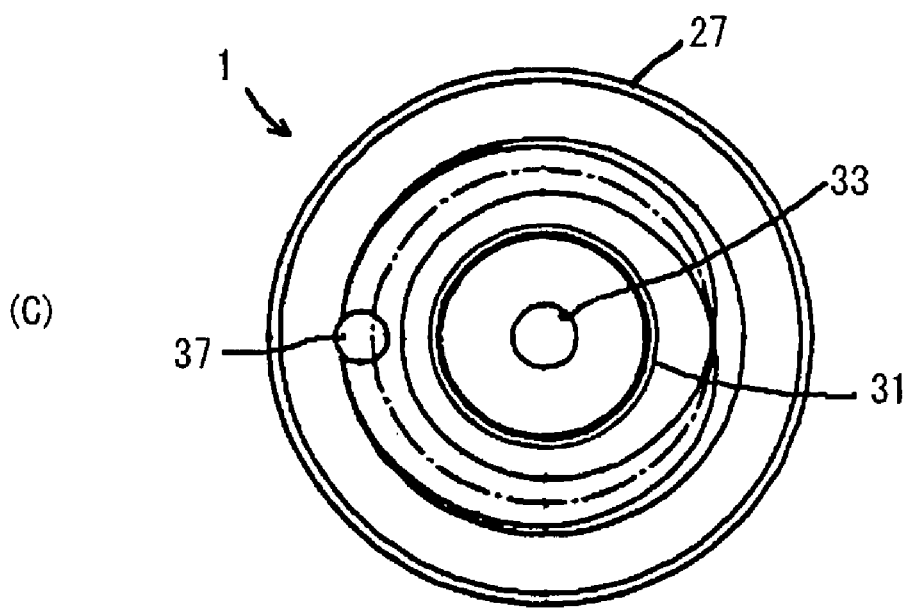

1: fixed head, 12: housing support member, 15: housing, 16: peripheral flange, 19: connector ring, 20: female thread, 22: peripheral rim, 24: pin, 26: engaging piece, 27: male thread, 28: locking tong, 30: spring, 29: sleeve, 31: sealing cylinder, 33: filtrate outlet, 40: filter element, 42: annular outlet portion

FILTER DEVICE

RELATED APPLICATIONS

This application is the U.S. National Stage of International Application No. PCT/JP2004/002742, filed Mar. 4, 2004, published in Japanese, and claims priority under 35 U.S.C. § 119 or 365 to Japanese Application No. 2003-060229, filed Mar. 6, 2003.

FIELD OF THE INVENTION

The present invention relates to a filter device containing an exchangeable filter element therein. More particularly, the present invention relates to a filter device which includes a connector means for connecting a housing containing a filter element therein to a fixed head for connecting to a piping system. The fixed head is provided with an inlet for a fluid to be filtered and an outlet for filtrate, and, if necessary, a gas vent port for venting gases within the filter device.

BACKGROUND OF THE INVENTION

Filter devices used for purifying or separating fluids such as liquids or gases may be classified into a disposable type in which the filter element encased therein is not exchangeable and an exchangeable type in which the filter element encased therein is exchangeable. The disposable type filter device is uneconomical and resource-wasting because a large volume of synthetic resin is used for forming a housing for encasing the filter element and a lid (fixed head) provided with fluid inlet and outlet.

On the other hand, the exchangeable type filter comprises, as described in JP10-110657 A, JP 8-200572 A and JP 5-361212 A, a fixed head having a manifold provided with an inlet and an outlet, and a housing containing therein a filter element. The housing is detachably connected at one end with the fixed head so that the filter element can be exchanged. Such exchangeable type filter device may be classified into the following types.

(1) At a mating portion between the fixed head and the housing, a male thread is formed on an outer rim of the fixed head, an outer rim of the housing is supported by an idle ring having a female thread on its inner periphery, and the female thread of the idle ring is threaded onto the male thread of the fixed head to connect the housing to the fixed head.

However, it is troublesome to carry out the screwing operation while holding the weight of the housing against the gravity, especially when the housing has a large weight, and all the more troublesome when the housing is made of stainless steel.

(2) At the mating portion between the fixed head and the housing, rims projecting outward are respectively formed on the fixed housing and the housing and these rims are tightened together with a clamp band or ring band.

(3) At the mating portion between the fixed head and the housing, rims projecting outward are respectively formed on the fixed housing and the housing, a plurality of through-holes are formed in the rims at given intervals and these rims are tightened together with bolts and nuts utilizing the through holes.

In the cases (2) and (3), too, operations of supporting the weight and tightening the clamp or bolts is laborious if the size of the housing is large, especially when a stainless steel housing is required.

Patent Literature 1: JP 10-110657 A
Patent Literature 2: JP 8-200572 A
Patent Literature 3: JP 5-361212 A With the case (1) above, it is difficult to turn the threaded ring many times about the threaded fixed head while holding with a hand the housing containing a filter element against the gravity, especially when the housing has a large weight.

In the case (2) above, in order to assemble or exchange the filter device, the housing containing a filter element is first held by a hand or hands against the fixed head to engage the rims to each other, the clamping band is fit over the rims, and then the band is tightened by pulling it with a clamping fixture (bolt and nut, for example) mounted on both ends of the clamping band. This operation is difficult for one operator because it is required to align the housing as well as the clamping band to a predetermined position of the fixed head, a large force is necessary especially when the weight of the housing and the filter element is heavy, the housing falls down during the tightening operation if the alignment is not properly done, and tightening and removal of the clamping band are laborious and time-consuming operations.

In the case (3), too, it is necessary to hold the housing against the fixed head by a hand or hands to put the peripheral rims together, in such manner that the through-holes are registered, and the rims are tightened together with bolts and nuts using the trough-holes.

On the other hand, disengagement of the housing requires similar complicated and time-consuming jobs.

Accordingly, an object of the present invention is to provide a filter device of the type that the housing is reusable and the filter element is exchangeable, which is free of the above-described drawbacks and the connection and disconnection of the housing for replacement of the filter element can be easily performed by simple operations.

DISCLOSURE OF THE INVENTION

The inventor has conducted an extensive study on a structure of a filter device of the type that filter element can be exchanged, including a housing and a lid portion forming a fixed head, both made of an corrosion-resistant metal or resin such as stainless steel in order to permit permanent use of them, in which the housing can be easily connected to and disconnected from the fixed head by actuation of a manipulating handle, and the housing can be easily moved to a position where the fixed head does not interfere with the exchange operation of the filter element contained in the housing.

As a result, the inventor has reached an idea of tilting the housing when exchanging the filter element to make it easy to carry out the exchange operation even with a large and heavy filter element while the fixed head is fixed to a stationary support frame, For this purpose, the housing containing the filter element is moved from its initial tilted position to a vertical position underneath fixed head, then pushed up vertically to urge the tops of the housing and the filter element against the fixed head and then is air-tightly connected to the fixed head. On the other hand, after use of the filter device, the reverse movements are performed.

More particular, the present invention comprises as follows, in which reference numerals are added for the sake of convenience.

According to a first mode of the invention, a filter device is provided which comprises: a fixed head 1 having a feed liquid inlet and/or outlet for filtrate, a stationary base member 2, 3, a first link 7 having one end pivotally mounted on the stationary base member at a first axis 5, a second link 11 supported by the first link, a housing support member 12 supported by the second link, and a housing 15 supported by the housing support member, said housing having a space with an open top end for housing a filter element, a manipulation handle 17 fixed to the housing 15 or the housing support member 12, and a connector means 19 for connecting the top end portion of the housing to the fixed head, said housing 15 is movably supported by the housing support member 12 having a means for allowing the housing 15 to move relative to the housing support member by a distance necessary for connecting the connector means 19 to the fixed head 1.

The means for allowing the housing to move may simply have a construction in which the housing 15 is slidingly supported by the housing support member but preferably is composed of a sleeve 29 for supporting the upper portion of the housing, and a resilient member 30 inserted between the sleeve 29 and the housing support member 12.

With this first mode of the invention, when this invention applied to a connector means of the conventional type as explained in (1) above, an advantage of easy thread connection or disconnection is obtained because the housing 15 is maintained at a closest position to the fixed head 1 during the step of revolving the connection ring 19 in the tightening direction or in the reverse loosening direction to cause the female thread 20 of the ring to tighten to the male thread 27 of the fixed head 1 or loosen the male thread from the male thread of the fixed head.

Also, it will be evident that similar workability can be obtained when the present invention is applied to the conventional connection types as explained in (2) and (3) above.

It is preferred that said first link 7 extends generally upward along a vertical line from the first axis 5 when the upper end portion of the housing (15) is engaged with the fixed head (1).

With this mode of the invention, the upper end of the housing can come close right below the fixed head and the weight of the housing is supported by the stationary support frame by way of the first link, so that the work of connection (screwing and other works) of the housing to the fixed head becomes easier.

Preferably, a second link 11 is pivotally mounted at a second axis 9 to the first link 7. In this case, both of these links may be fixed together or swingable with respect to each other in a given range of angle, for example, 90 degrees.

Preferably, the second link 11 is pivoted to the housing support member 12 by means of a third axis 13 and the second link 11 has an abutting portion 21 which is capable of abutting against the housing, whereby the housing is maintained in vertical posture by gravity during steps prior to abutment of the abutting portion against the top portion of the housing and after disengagement from the top portion of the housing, and is held in tilted posture in the abutted condition.

With this mode of the invention, since the housing is maintained in the vertical orientation, right before the top end of the housing is engaged with the fixed head and right after the top end of the housing is disengaged from the fixed head, the housing can be smoothly raised for connection or lowered for tilting without interference from the fixed head.

Further, the pivot (the third axis) for tilting the housing is moved away by a necessary distance from the vertical axis of the fixed head owing to the tilting of the first link 7, the tilting of the housing can be effected without collision of the housing against the fixed head even if the top of the housing is closely spaced from the fixed head.

Preferably, the relative angle between the first link 7 and the second link 11 is restricted to a given range, 45 degrees for example, capable of allowing the tilting of the housing 15.

Further, the first axis 5, second axis 9 and the third axis 13 are in mutually parallel relation.

If necessary, the stationary base member 3 is provided with a stopper 23 and the second link 11 is provided with an engaging portion 25 capable of engaging the stopper at a lowermost position of the tilted housing. With this mode, since the housing is fixed at a tilting angle the replacement of the filter element can be easily done.

According to another mode of the invention, the fixed head 1 is provided with a male thread 27 on its outer periphery, and the connector ring 19 is provided with a female thread 20 bonding to male thread 27 on its inner periphery.

With this mode, the present invention achieves a superior result as applied to the connector 19 of the conventional type (1) as explained.

In a specific embodiment of the present invention, the filter device includes a fixed head 1 having a feed liquid inlet and/or outlet for filtrate, a stationary base member 2, 3, a first link 7 having one end pivotally mounted to the stationary base member at a first axis 5, a second link 11 pivotally mounted on the first link at a second axis 9 parallel to the first axis at an opposite end of the first link 7, a housing support member 12 supported by the second link 11, and a housing 15 pivotally mounted to the second link 11 at a third axis 13 parallel with the second axis 9, said housing having a space with an open top end for housing a filter element, a manipulation handle 17 fixed to the housing 15 or the housing support member 12, and a connector means 19 for connecting the top end portion of the housing to the fixed head, said housing 15 is movably supported by the housing support member 12 having a means for allowing the housing 15 to move relative to the housing support member by a distance necessary for connecting the housing 15 to the fixed head 1. The means for allowing the housing to move may simply have a construction in which the housing 15 is slidingly supported by the housing support member but preferably is composed of a sleeve 29 for supporting the upper portion of the housing, and a resilient member 30 inserted between the sleeve 29 and the housing support member 12.

In operation, when the top end of the housing is to be closed against the fixed head, the housing is raised by the handle from the tilted position and the housing takes the vertical posture by gravity at the raised position. Then, the top end of the housing 15 can be air-tightly connected with the fixed head 11 by means of the connector means 19 which is engaged with an outer rim or flange 16 of the housing 15. At the same time, this connection pulls up the filter element 40 and the annular outlet portion 42 of the filter element is pushed into the sealing cylinder 31 of the fixed head.

On the other hand, when the housing is to be disconnected from the fixed head, the connector means is disengaged and the reverse operation is performed.

According to the present invention, the housing can be easily attached to or detached from the fixed head only by one operator and, in the exchange position, it is easy to exchange the filter element at the tilted housing position. Moreover, because the present invention employs two axes and two links in combination, great freedom or versatility of the position and the tilting angle of the housing is provided and filter replacement work is made possible depending on the situation on the site of installation.

The embodiment described in the following is one which utilizes the connector means of the conventional type (1), but is should be noted that the present invention is equally applicable to embodiments which utilize the connector means of the conventional types (2) and (3).

DESCRIPTION OF THE DRAWINGS

FIG. 4 is a fixed head used in the embodiment of the present invention where (a) is a plan view, (b) is a front view and (c) is a bottom view.

BEST MODE FOR CARRYING OUT THE INVENTION

Embodiments of the present invention will now be explained in detail in reference to FIGS. 1–8.

FIGS. 1–4 illustrates a filter device including a fixed head 1 and a housing 15 air-tightly connected to the fixed head 1, FIGS. 5–8 shows sequential steps of moving the housing 15 from a vertical connected position to a tilted position where filter element is exchanged, and reverse sequential steps of moving the housing from the tilted position to the vertical connected position.

Filter Element

Figure 6:
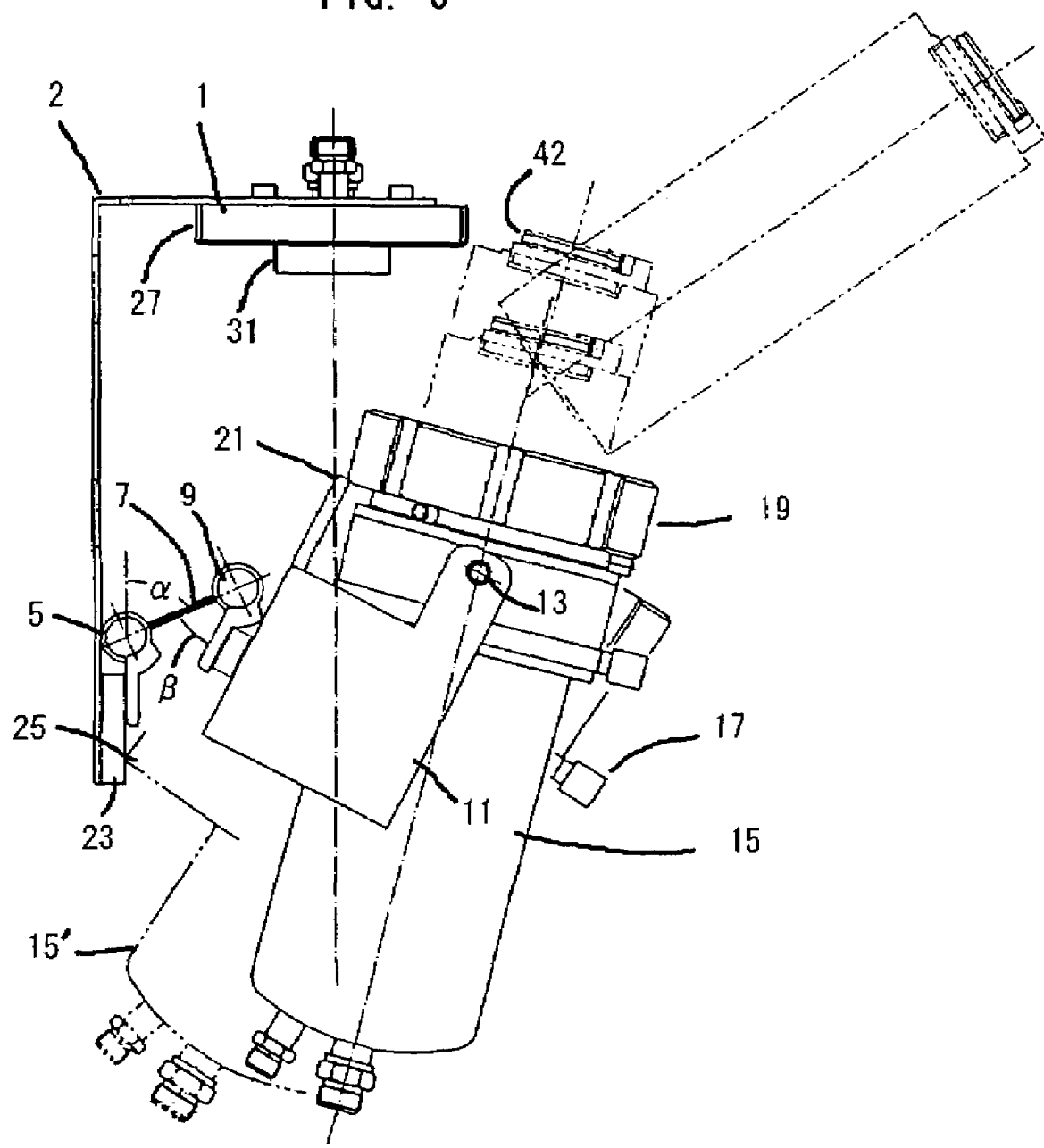
FIG. 6 is a left view of the filter device in two tilted positions.
Figure 7:
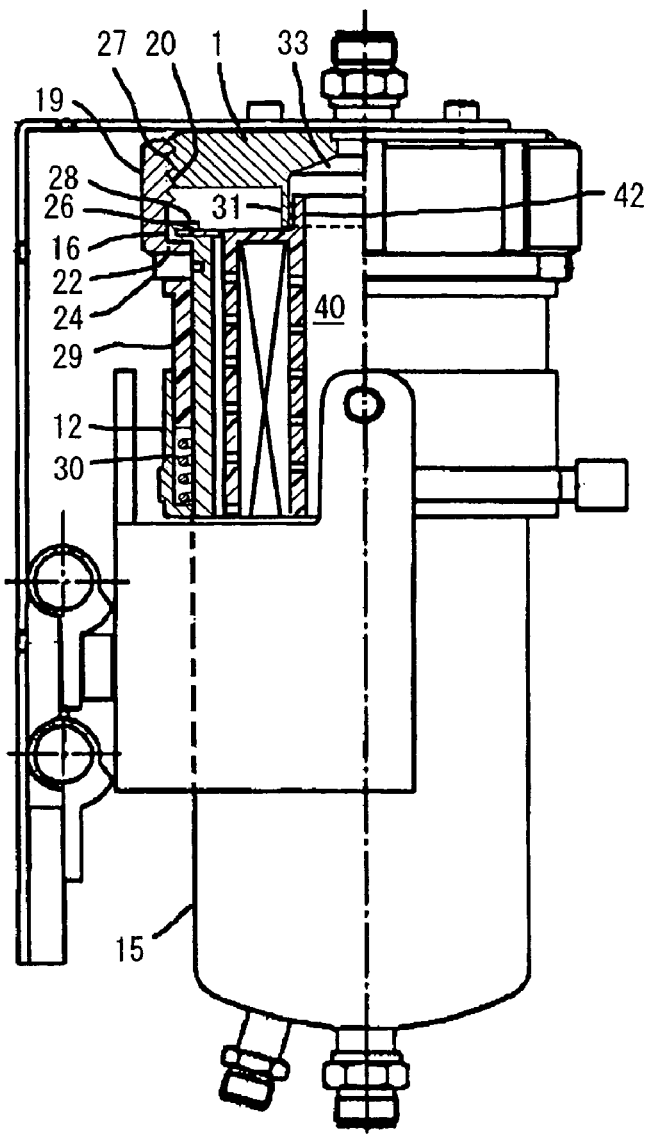
FIG. 7 is a left view of the filter device with the upper portion being partly broken.

The filter element is of the exchangeable type which is well known in the art. FIGS. 6–7 show one example of exchangeable type filter elements. The filter element 40 typically includes an inner support cylinder made of a thermoplastic resin such as fluororesin, polypropylene or polyethylene and having many perforations, a pleated filter membrane formed by pleating the membrane made of a resin such as PTFE, PP or PE and formed into an endless shape and arranged around the inner support cylinder, an outer perforate support cylinder made of a thermoplastic resin and arranged around the pleated filter membrane, and end caps welded to the upper and lower ends of the pleated filter membrane as well as to the upper and lower ends of the inner and outer perforate support cylinders.

In a position that the filter element 40 is housed in the housing 15 made of a heat resistant and/or corrosion resistant material such as stainless steel, an outer flow passage is formed between the outer support cylinder and the housing 15 for liquid to be filtered (feed liquid) and the feed liquid flows through the passage, passes through the perforations of the outer support cylinder and permeates thorough the filter membrane into the internal passage of the inner support cylinder as a filtrate.

As seen from FIGS. 6–7, projected from the upper end of the filter element 40 is an annular outlet portion 42 having a flow passage communicating with a filtrate outlet 33 of the fixed head 1 and an O-shaped sealing ring is fit around the outlet portion 42.

Fixed Head

Figure 3:
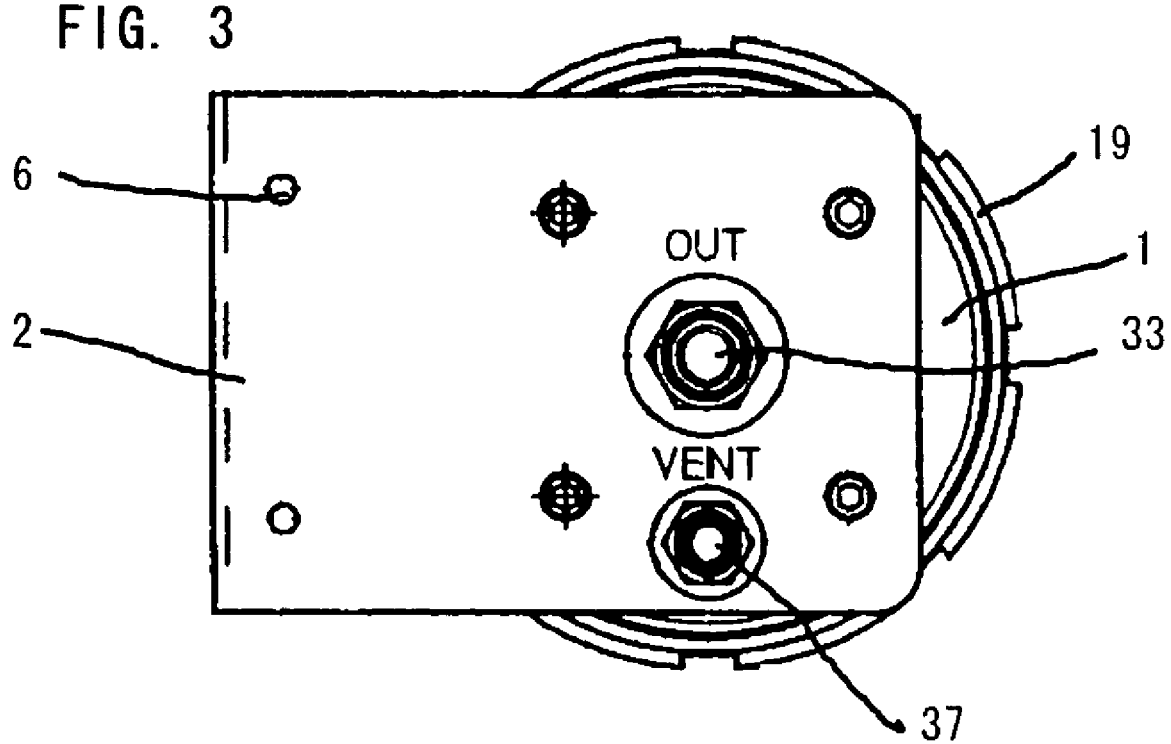
FIG. 3 is a plan view of the filter device according to the embodiment of the present invention in which the housing is connected with the fixed head.

Referring to FIGS. 4–7, a male thread 27 is formed around the outer periphery of the fixed head 1. The male thread 27 can be connected to a female thread 20 (FIG. 7) of a connection ring 19 provided on the top end of the housing 15. The lower end of the fixed head 1 is provided with a sealing cylinder 31 having the filtrate outlet portion 33 in a position corresponding to the annular outlet portion 42 of the filter element 40 and can be communicated with the inner passage of the filter element 40 and the inner periphery of the sealing cylinder 31 can be air-tightly fit on the annular outlet portion 42 of the filter element 40. The fixed head 1 is provided with a vent port 37 for withdrawing gases in the feed liquid (FIGS. 3–4). The fixed head 1 is fastened to the support frame 2 with fastening means such screws 4. The frame 2 is fixed on a wall or a base in a factory or laboratory, utilizing holes 6.

Although this embodiment is an example having the feed liquid inlet being provided on the housing side, it should be understood that, depending on applications, the inlet may be alternatively on the side of the fixed head and the vent port may be dispensed with, or any other designs may be possible according to the publicly known techniques.

Housing

The housing 15 comprises a cylinder made of stainless steel with an open top and a closed bottom and a filter element 40 is encased within the housing. As shown in FIG. 7, the top end of the housing 15 is provided with an expanded outer peripheral flange 16, the underside of which is supported by an inner peripheral rim 22 provided at the lower end of a connector ring 19. The inner periphery of the connector ring has a female thread 20 adapted to be engaged with the male thread 27 of the fixed head 1. The connector ring 19 is rotatably supported on fixed pins 24 secured to the outer periphery of the housing 15 at given intervals.

The housing 15 is supported by the housing support member 12 made of stainless steel or other metals. The housing support member 12 is in the form of an annular ring surrounding the housing and is supported by a link mechanism as will be explained in detail in the following. The support member 12 may directly support the housing 15 in such manner that the housing 15 is vertically movable within a predetermined range but preferably supports the housing 15 by means of a annular sleeve 29 made of metal or a hard resin and a resilient member such as a compression spring 30. The spring 30 surrounds the outer periphery of the housing 15. The upper end of the sleeve 29 supports the housing 15 by way of the pins 24. The spring 30 has such a strength that it supports at least part of the weight of the housing (In other words, when all weight of the housing is loaded on the spring 30, the spring is completely compressed and buckled to transmit the weight to the support member 12). Thus, with use of the sleeve 29 and the spring 30, when the connector ring 19 is rotated with a hand for connection, while maintaining the housing support member 12 at the highest position by the below-explained link mechanism, the weight of the housing 15 is partly supported by the support member to make the connection operation easier. On the other hand, when the connector ring 19 is disengaged, falling of the housing to strike against the housing support member 12 is prevented.

The housing support member 12 is provided with a handle 17 for manual operation.

As shown in FIG. 7, locking tongs 28 are provided at one or two locations of the top of the inner periphery of the housing 15. The tongs 28 are adapted to engage engaging pieces 26 provided on the top of the outer periphery of the filter element 40 when the filter element 40 is inserted in the housing and rotated by a small angle in clockwise or counter clockwise direction. If this locking mechanism is not present, the annular outlet portion 42 of the filter element 40 cannot be removed from the fixed head 1 by gravity when the connector ring 19 is disengaged from the fixed head 1 and the proper operation of the link mechanism will be hindered. Thus, the use of the engaging pieces and the locking tongs allows the filter element 40 to move together with upward and downward movement of the housing to connect the flow passages to the corresponding passages in the fixed head.

Figure 1:
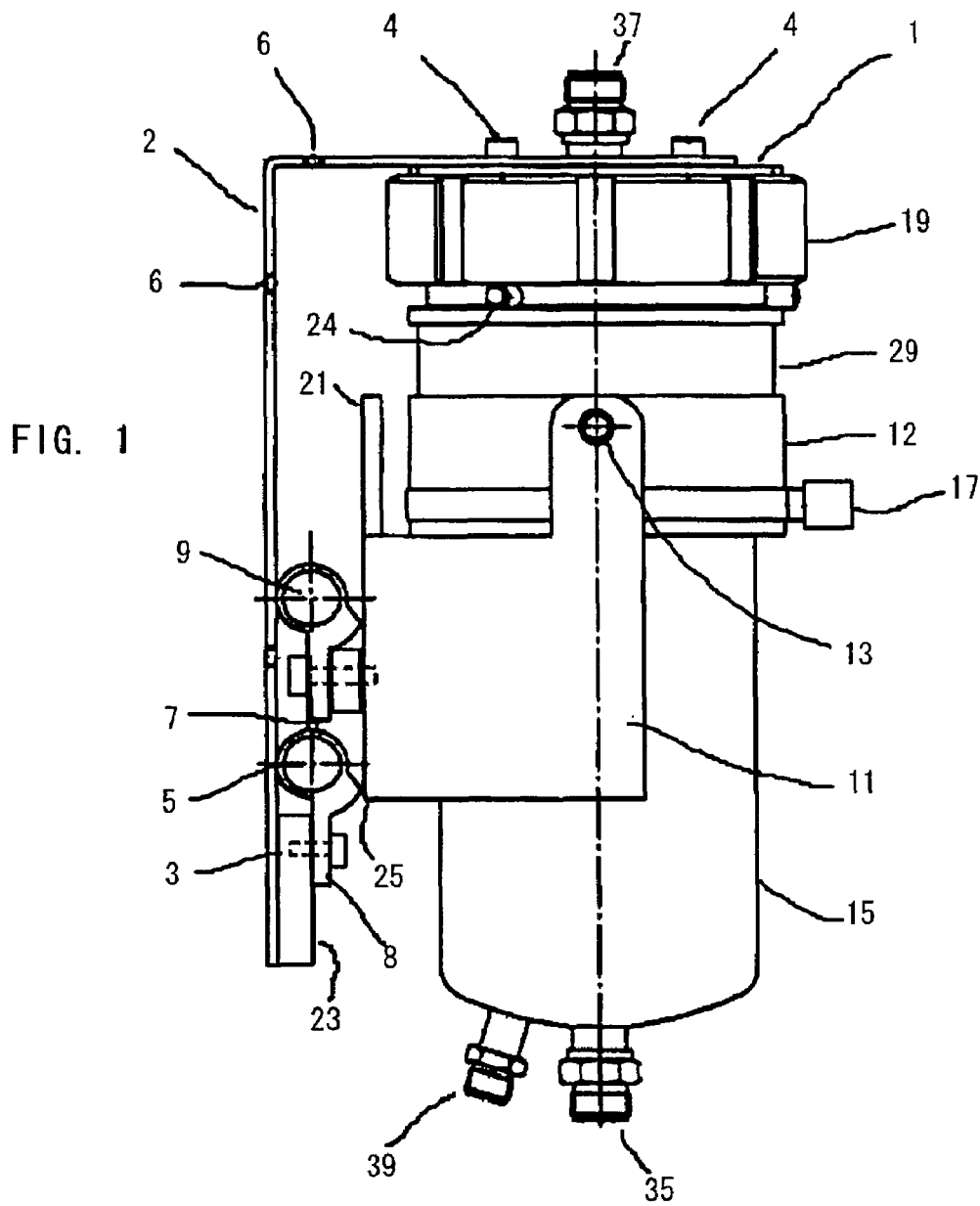
FIG. 1 is a left side view of a filter device according to an embodiment of the present invention in which the housing is connected with the fixed head.

As shown in FIG. 1, the housing 15 is provided with a feed liquid inlet 36 and if necessary a discharge outlet 39 for exhaust liquid. Further, in case the feed liquid inlet is provided on the side of the fixed head 1, the feed liquid inlet 35 at the bottom of the housing is not necessary or may be used as a discharging outlet for the feed liquid flowing along outside of the filter element 40. In short, these portions are matter of design depending on the applications.

Tilting Mechanism

Referring now to FIGS. 1, 2, 5, 6 and 8, the tilting mechanism which is characteristic portion of the present invention will be explained.

A base member 3 is fixed or integrally attached to the support frame 2. A horizontal shaft or axis 5 is pivotally supported by a bearing member 8 fixed to the base member 3. The first axis 5 supports one end of a first link 7 and the opposite end of the first link 7 pivotally supports a second shaft or axis 9 parallel with the first axis 5. The second axis 9 supports one end of a second link 11 and the opposite end of the second link 11 supports a housing support member 12 at a third axis 13. As already explained, the housing support member 12 supports the housing 15 by means of the spring 30 and the sleeve 29.

Figure 2:
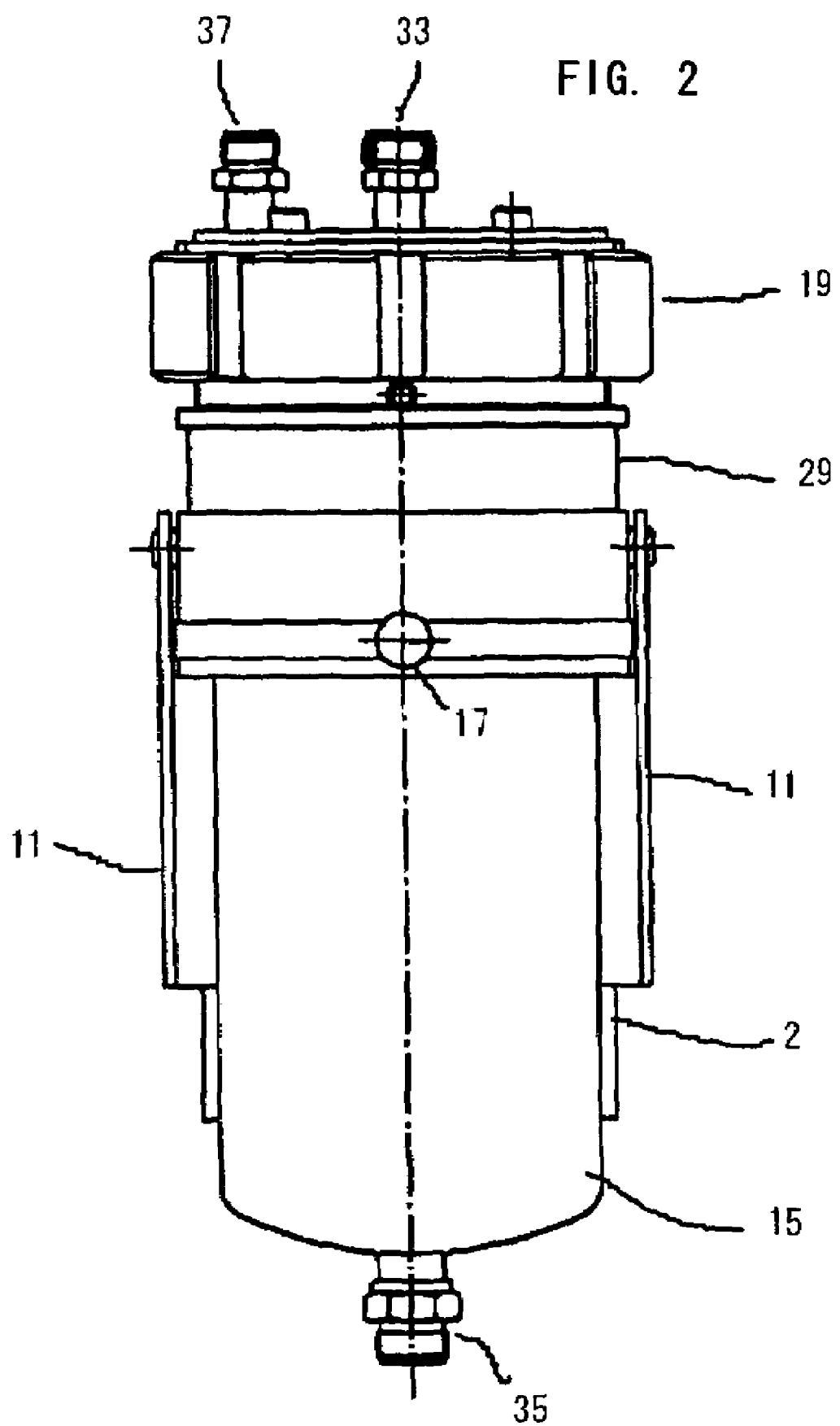
FIG. 2 is a front view of the filter device according to the embodiment of the present invention in which the housing is connected with the fixed head.
Figure 5:
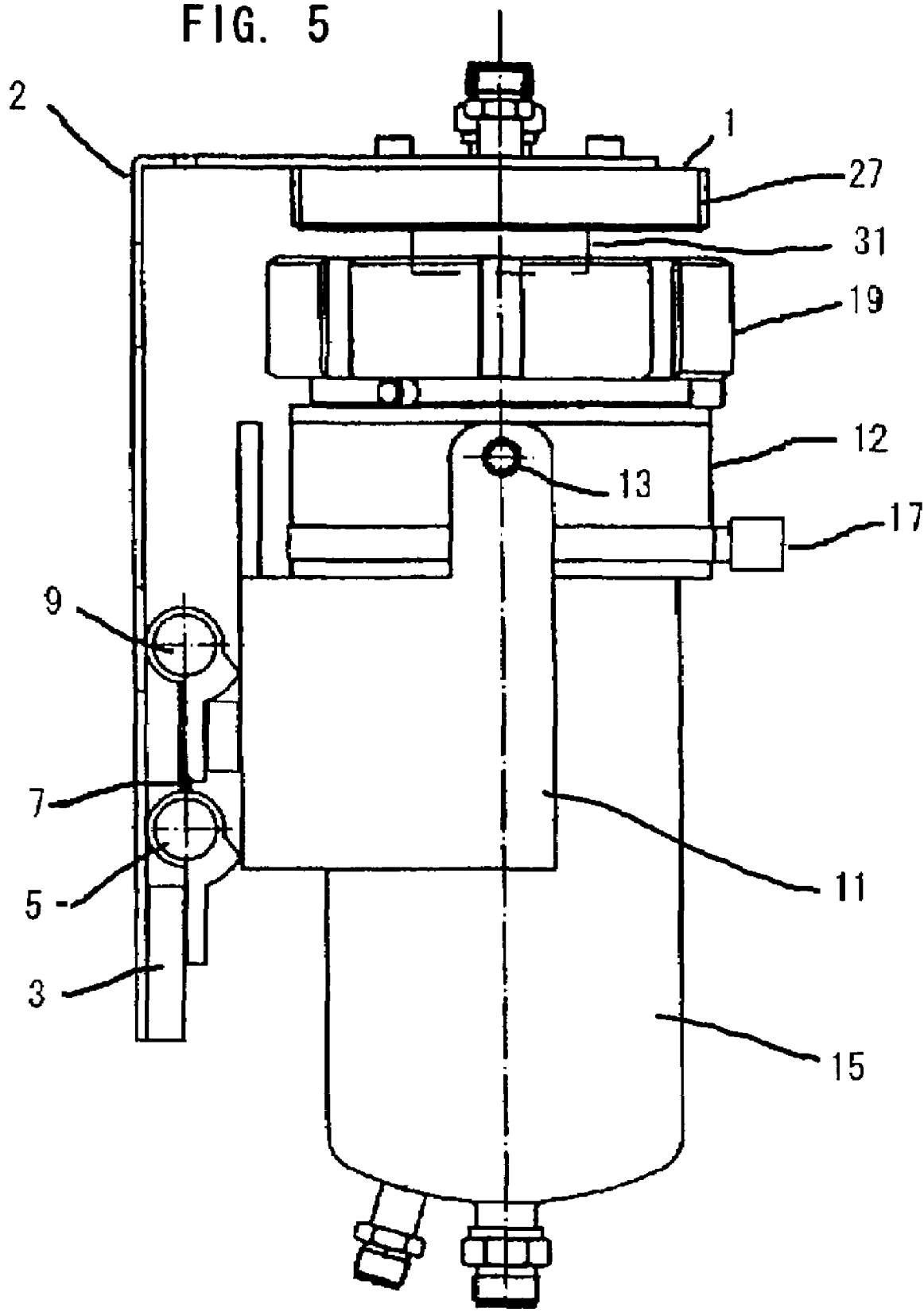
FIG. 5 is a left view of the filter device right after the connection ring 19 has been disconnected from the head 1.

At the connected position shown in FIGS. 1–2 and at the disconnected position shown in FIG. 5, the first link 7 extends generally vertically from the axis 5 or slightly slanted from the vertical line passing through the axis 5 in the direction opposite to the housing 15. This means the condition that the weight of the housing 15 is supported by the first link 7 but rotational force is little applied to the first link 7, whereby the manipulation of the connector ring 19 is facilitated during the connecting and disconnecting operations.

The second link 11 is provided with an abutting portion 21 to maintain the vertical position of the housing 15 by gravity around the third axis 13 during the stroke right before the top of the housing is engaged with the fixed head 1 or the stroke right after the top of the housing 15 is disengaged from the fixed head 1 (FIG. 5) and to tilt the housing when the first link 7 is slanted more than a certain angle. Without this abutting portion 21, it is difficult to tilt the housing and withdraw the filter element.

Further, the fixed base member 3 is provided with a stopper portion 23 and the second link 11 is provided with an engaging portion 25 which is brought into abutment with the stopper portion 23 when the housing is to its lowermost position.

In order to give a convenient tilt angle to the housing 15 for exchange of the filter element, the swing angle of the first link 7 from the vertical line is preferably restricted to a certain angle. For example, the swing angle $\alpha$ is restricted to 90 degrees or less. Similarly, the swing angle $\beta$ of the second link 11 with respect to the first link 1 is restricted to a given angle so that the housing is tilted through the abutting portion 21. The preferred angle is within 45 degrees and more preferably within 35 degrees. It is noted that even if the first link and the second link are fixed, the operation is still possible but the freedom is reduced.

Restriction of these angles may be effected by providing stoppers between the stationary base member 3 and the first link 7, and the first link and the second link.

Further, a spring may be loaded on the first axis 5 and/or second axis 9 to normally urge the first link 7 or the second link 11 in a direction opposite to the rotation of the first link and/or second link to counterbalance the rotational force generated by the weight of the housing so as to hold the housing at rest. With this mode, the stoppers for controlling the angle between the first link 7 and/or the second link 11 can be dispensed with.

This tilting mechanism will be better understood by making reference to the following operation.

Figure 8:
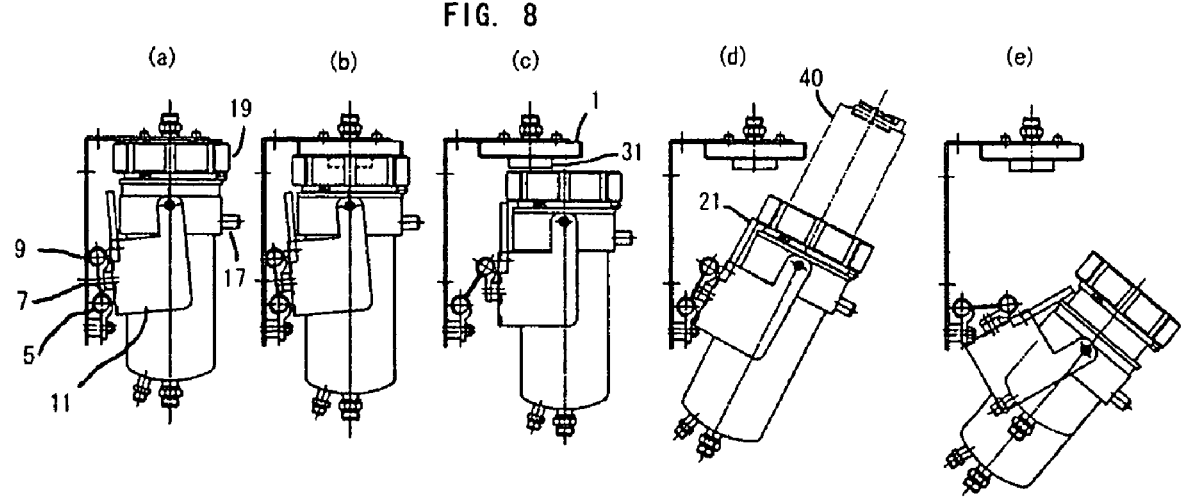
FIG. 8 is an explanatory view showing the operation of the filter device during the exchange of the filter element.

FIG. 8 is a view explaining the operation of the present invention in which (a) to (e) show sequential steps for exchange of the filter element. The connected condition is shown in (a) and, the housing is tilted to (b) and then (c) to the tilted position shown in (d). After the exchange of the filter elements, the reverse steps are followed.

It should be noted that it is possible to perform the step (c) or (d) subsequent to the step (b) and the steps (d) or (e) subsequent to the step (c) and thus the present device has a flexibility in operation.

FIG. 1 and (a) of FIG. 8 show the condition where the housing 15 containing the filter element 40 therein is hermetically connected to the fixed head 1 and in the condition that a feed solution supplied from the feed liquid inlet 35 flows into the outer passage formed between the inner wall surface of the housing 15 and the filter element 40 and permeated filtrate flows from the internal passage of the filter element 40 to the annular outlet portion 42 and then to the filtrate outlet 33 of the fixed head 1.

When it becomes necessary to exchange the filter element 40, the connector ring 19 is manually revolved to loosen its thread. As the connector ring descends, the housing 15 is allowed to descend within the stationary housing support member 12. Then, the female thread 20 of the connector ring 19 is completely disengaged out of the fixed head 1. At this moment the sleeve 29 has pressed down the spring 30 to the position shown in FIG. 5 and (b) of FIG. 8. During the above operation, the most of the weight is stably supported by the stationary base member 3 by way of the sleeve 29, the spring 30, housing support member 12, the second link 11 and the first link 7 and the rest of the weight is supported by the fixed ring 1 by way of the connector ring 19. For this reason, the resistance exerted on the connector ring 19 by the weight of the housing 15 is alleviated and accordingly the loosening operation of the connector ring 19 is facilitated. If the weight of the housing is not very large, a design in which the sleeve 29 and the spring 30 are omitted is possible although the present embodiment is more desirable.

Then, by pulling the handle in the forward direction (to the right in FIG. 8), the first link 7 begins to swing about the first axis 5, and correspondingly the housing 15 is moved downward and forward while the vertical posture is maintained by gravity (it should be noted that the third shaft 13 is present above the center of gravity of the housing). Thus, the housing 15 comes out of the fixed head 1 without interference from the sealing cylinder 31. Thus, with the construction in which the housing is not tilted during the initial stage although the first link 7 is rotated, whereby disengagement of the housing from the fixed head is facilitated.

On the other hand, it is also possible to pull the handle 17 in the forward direction to swing the first link 7 while keeping the angle of the first link 7 and the second link 11 unchanged and in this case, too, the second link 11 may be kept out of contact with the housing 15 up to a certain initial slanting angle of the first link 7 and thus the housing 15 can be brought out of the fixed head 1 into a position shown in (d) of FIG. 8. At this position, the hand is removed from the handle 17, the housing 15 is moved downward and brought to engage with the second link where the housing is kept at a tilted position Alternatively, in the position (c) of FIG. 8, pulling the handle 17 further pulled in the forward direction, the second link 11 is swung forward about the second axis 9. The housing is tilted without interference of the top end of the housing with the fixed head because the second axis 9 has already been apart from the vertical line of the fixed head 1 at this stage.

As shown in (d) of FIG. 8, when tilted, the housing 15 tends to return to the vertical posture due to the gravity. However, if the first axis 5 and the second axis 9 are of the spring-loaded type, the springs act as a resistance and the abutting portion 21 of the second link 11 comes to contact with upper portion of the housing and accordingly the housing is tilted together with the second link.

On the other hand, if such springs are not loaded, the second link 11 must occupy the maximum angle β with respect to the first link in order that the abutting portion 21 comes to contact with the housing 15 (position (e) of FIG. 8).

Thus, the tilt angle of the housing cay be freely set by appropriately slanting the first link 7, or the second link 11, or both of them (the position shown in FIG. 6 and (d) of FIG. 8; or (d) of FIG. 8)). Since the slant angles of the first link 7 and the second link 11 have degree of freedom and accordingly the height and tilt angle of the housing are highly flexible and is easy to use.

However, from the sake of working efficiency, an engaging portion 25 which is a part of the second link 11 may come to contact with the stopper 23 as shown by imaginary line 15' of FIG. 6. In this case, it is preferred to limit the maximum angle of the first link. Exchange of the filter element 40 is carried out at the tilt position of the housing shown in FIG. 6 and (d) of FIG. 8; or (e) of FIG. 8.

After the filter element 40 has be replaced with new one, the handle 17 is pushed up from the position (d) or (e) of FIG. 8 to the position (c) and then to the position (b) where the annular outlet portion 42 of the filter element 40 is in registration with the sealing cylinder 31 of the fixed head. Further, since the first link 7 is generally vertical and hence stably supports the housing, there is little force to pushing out the housing in the forward direction. Moreover, the housing is in a condition closely spaced from the male thread 27 of the fixed head. Accordingly, the connector ring 19 can be revolved at ease to tighten the thread 20 of the ring to the male thread 27 of the fixed head 1.

From the foregoing, connection of the housing and the filter element with the fixed head can be easily carried out. Also, the filter device is of the type that the housing is reusable and exchangeable, leading to saving of resources.

In the present filter device, through simple handle manipulation the housing containing a filter element therein can be easily tilted from the initial tilted position back to the vertical position underneath the fixed head, and then the connector ring can be revolved to air-tightly connect the housing to the fixed head. When the exchange of the filter element becomes necessary, reverse operation can be easily carried. Also, the connection is stable.

Further, the labor and time required for exchange of the filter element are reduced according to the present invention.

What is claimed is:

1. A filter device comprising a fixed head (1) having a feed liquid inlet and/or an outlet for filtrate, a stationary base member (2, 3), a first link (7) having one end pivotally mounted on the stationary base member at a first axis (5), a second link (11) supported by the first link, a housing support member (12) supported by the second link, and a housing (15) supported by the housing support member, said housing having a space with an open top end for housing a filter element, a manipulation handle (17) fixed to the housing (15) or the housing support member (12), and a connector means (19) for connecting the top end portion of the housing to the fixed head (1), said housing (15) is movably supported by the housing support member (12) having a means for allowing the housing (15) to move relative to the housing support member by a distance necessary for connecting the connector means (19) to the fixed head (1).

2. The filter device according to claim 1, wherein said means for allowing the housing to move is composed of a sleeve (29) for supporting the upper portion of the housing, and a resilient member (30) inserted between the sleeve (29) and the housing support member (12).

3. The filter device according to claim 1, wherein said first link (7) extends generally upward along a vertical line from the first axis (5) when the upper end portion of the housing (15) is engaged with the fixed head (1).

4. The filter device according to claim 1, wherein said first link (7) is swingable in a range between a vertical line passing through the first axis (5) and a tilted position where the filter element can be exchanged.

5. The filter device according to claim 1, wherein said second link (11) is pivotally mounted on the first link (7) at a second axis (9).

6. The filter device according to claim 1, wherein said second link (11) is pivotally mounted on the housing support member (12) at a third axis (13) and the second link (11) has an abutting portion (21) which is capable of abutting against said housing, whereby the housing is maintained in a vertical posture by gravity during steps prior to abutment of the abutting portion against the top portion of the housing and after disengagement from the top portion of the housing, and is held in tilted posture in the abutted condition.

7. The filter device according to claim 1, wherein the angle of said second link (11) is restricted in a range capable of allowing the tilting of the housing.

8. The filter device according to claim 1, wherein said first axis (5), the second axis (9) and the third axis (13) are in mutually parallel relation.

9. The filter device according to claim 1, wherein said stationary base member (3) is provided with a stopper (23), and said second link (11) is provided with an engaging portion (25) capable of engaging the stopper at a lowermost position of the tilted housing.

10. The filter device according to claim 1, wherein said fixed head (1) is provided with a male thread (27) on its outer periphery, and said connector ring (19) is provided with a female thread (20) on its inner periphery.

\* \* \* \* \*